United States Patent [19]
Pearson et al.

[11] 3,803,378
[45] Apr. 9, 1974

[54] FORMATION OF INTERCELL CONNECTORS IN LEAD ACID ELECTRIC STORAGE BATTERIES

[75] Inventors: Ernest James Pearson, Swinton; Bryan Price, Adlington, near Chorley, both of England

[73] Assignee: Corival Limited, Little Lever, Near Bolton, Lancashire, England

[22] Filed: June 28, 1972

[21] Appl. No.: 267,099

[30] Foreign Application Priority Data
June 28, 1971 Great Britain.................. 30234/71

[52] U.S. Cl. .......................... 219/104, 136/134 R
[51] Int. Cl. B23k 11/02, H01m 13/10, H01m 35/32
[58] Field of Search.................. 219/104; 136/134 R

[56] References Cited
UNITED STATES PATENTS
3,723,699  3/1973  Allen ................................. 219/78
1,721,293  7/1929  Callender..................... 136/134 R X
3,600,232  8/1971  Daguenet....................... 136/134 R Primary Examiner—J. V. Truhe
Assistant Examiner—Hugh D. Jaeger
Attorney, Agent, or Firm—Watson, Cole, Grindle & Watson

[57] ABSTRACT

In a multicell electric storage battery a method of interconnecting the plates of neighbouring cells involves forming an intercell connector from a conducting insert and moulding it integrally in the partition so that the latter completely encircles it, and connecting the insert, by welding, to a pair of plate straps formed from or connected to the lugs of the plates to be connected.

10 Claims, 9 Drawing Figures

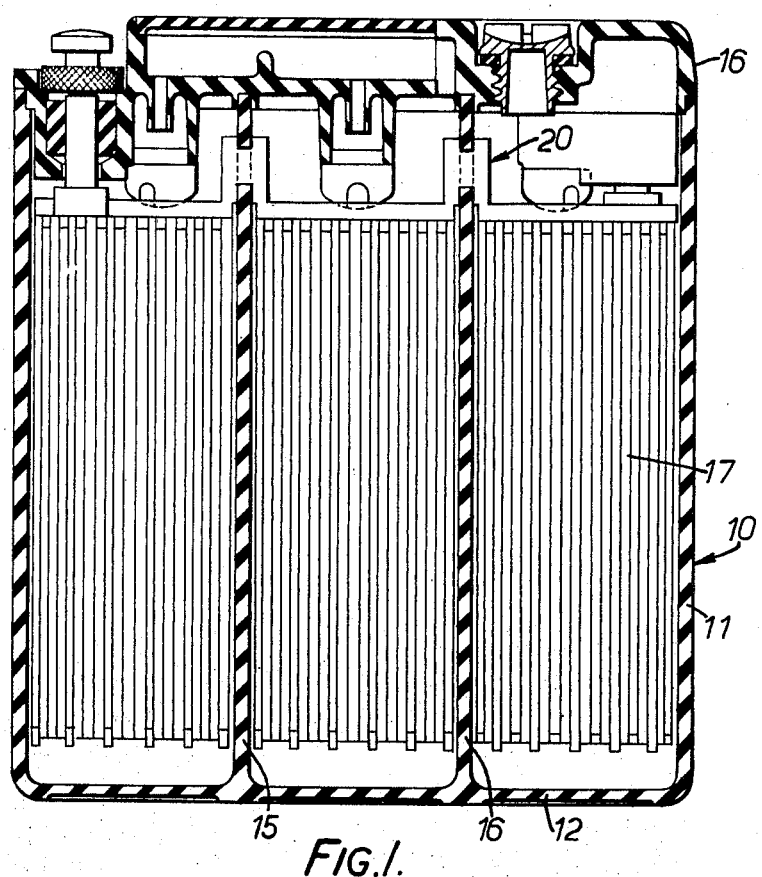
FIG./.
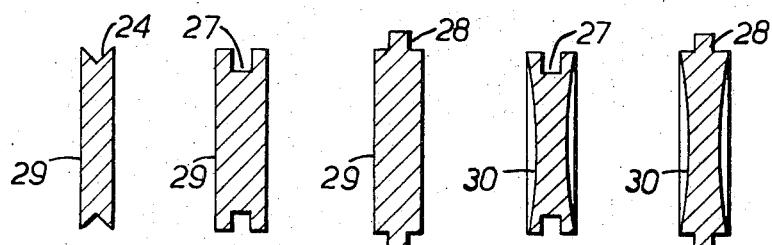
FIG.5.   FIG.6.   FIG.7.   FIG.8.   FIG.9.

FORMATION OF INTERCELL CONNECTORS IN LEAD ACID ELECTRIC STORAGE BATTERIES

This invention relates to the formation of intercell connectors in lead acid electric storage batteries and is concerned with the type of intercell connector which passes through an opening in the intercell partition, in order to connect the positive plates of one cell with the negative plates of a neighbouring cell in a comparatively direct line.

According to one aspect of the present invention in an electric storage battery each intercell connector is formed from a conducting insert moulded integrally in the partition so that the latter completely encircles it, and is connected by welding to a pair of plate straps formed from or connected to the lugs of the plates to be connected.

Preferably the inter-engaging margins of the insert and the partition are formed with projections and recesses to interlock and key the insert into position. For example, they may afford a tongue-and-groove joint either in the form of a double bevel or with a tongue or spigot of rectangular section. Either the tongue or the groove may be afforded by the insert.

The invention is particularly applicable to batteries having a casing formed by injection moulding from a synthetic plastics material. Certain such materials, in particular polypropylene, tend to shrink after moulding, and in a preferred form of the present invention such shrinkage is relied upon to provide an intimate seal between the insert and the opening in the partition.

The invention also includes a casing for such a battery, having the inserts incorporated in the partitions prior to the insertion of the plates and separators.

The welding operation may be accompanied by softening of the complete insert and sufficient pressure to cause it to expand in the opening, but preferably the welding only softens the insert locally and the seal relied upon is solely that obtained when the material of the partition shrinks after injection moulding.

The insert may be embodied in each partition in various ways. In one convenient arrangement each insert is located at the ends of reinforcing ribs formed integrally on opposite faces of the intercell partition, the ribs being formed by opposed grooves in opposed faces of the punch slabs serving to mould the partition wall, and the insert being located in the ends of such grooves prior to moulding of the casing.

Where, as is common practice, the casing is moulded on its side with the partition wall in a vertical plane, the grooves will extend horizontally in the direction of withdrawal of the punch slabs so that the insert will remain in place. The insert should be a close fit between the bottoms of the grooves, and the faces of the insert may be slightly hollow or concave so as to yield readily if the insert has slight interference fit between the bottoms of the grooves.

The invention may be put into practice in various ways but one specific embodiment and certain modifications will be described by way of example with reference to the accompanying drawings in which:

FIG. 1 is a sectional elevation through part of a multicell electric storage battery having intercell connectors in accordance with the invention.

FIGS. 5, 6, 7, 8 and 9 are sections through various alternative forms of lead insert.

Figure 2:
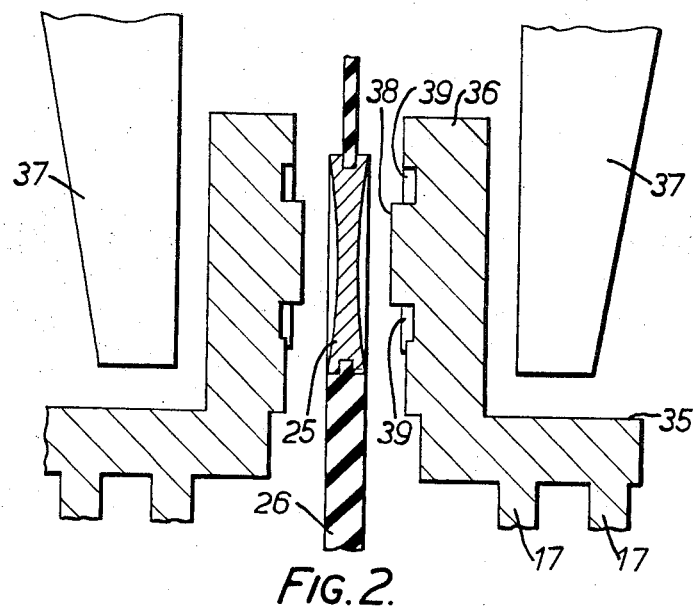
FIG. 2 is an enlarged exploded diagram similar to part of FIG. 1 illustrating the manner in which an intercell connection is formed.

The drawings show the invention applied to multicell electric storage batteries of lead acid type comprising a casing 10 formed by injection moulding from polypropylene. The casing comprises outer walls 11, a bottom 12 and intercell partitions 15, and is provided with a lid 16. Each cell contains positive and negative plates 17 of which the plates of one polarity are connected to those of opposite polarity in the neighbouring cell by an intercell connector generally indicated at 20.

Each intercell partition, which in a specific embodiment of the invention has a general thickness of 0.080 inches, has a metal insert 25 incorporated in it in the moulding operation at the point where the intercell connector is to pass through it. The insert is in the form of a disc of lead or lead alloy incorporated during the moulding operation.

Each intercell partition is formed with a vertical reinforcing rib 26 on each face extending from the bottom to the point where the insert is incorporated, the thickness of the rib being such as to make the overall thickness up to 0.125 inches, and its width being 0.750 inches. The insert has a thickness of 0.125 inches and a diameter of 0.750 inches so that its faces lie flush with the surfaces of the reinforcing ribs and the edges of the latter are tangential to the insert.

Preferably the periphery of the insert is formed with a tongue or groove so as to provide a tongue and groove joint when the partition is moulded about it as indicated in FIGS. 6 to 9. Thus in FIG. 5 the insert is shown with a double bevel or V groove 24 whilst in FIGS. 6 and 8 is shown with a rectangular section groove 27 which receives a corresponding tongue formed in the moulding of the partition. In FIGS. 7 and 9 the insert is formed with a tongue 28 which will occupy a corresponding groove formed in the moulding of the partition.

The circular faces 29 of the insert may be plane and parallel as shown in FIGS. 5, 6 and 7 or the insert may have slightly hollow or concave faces 30 as shown in FIGS. 8 and 9.

The plates of like polarity in each cell are connected together by a plate strap 35 of any convenient form having upstanding lugs 36.

The lug may be of parallel-sided form one inch wide with a semi-circular upper end so as to overlap the plastics material of the partition surrounding the insert, and a parallel sided recess in its face to receive the rib 26.

The lugs to be connected together are pressed towards one another, into contact with opposite faces of the insert, between a pair of welding jaws 37, and an electric current is passed through them between the jaws, the pressure being sufficient to ensure local fusion of the metal to produce a sound weld and to bring the surfaces of the lugs 36 into contact with the material of the partition surrounding the insert.

The magnitude and duration of the welding current are controlled to ensure that the insert is only heated momentarily and locally so as to effect the welding without appreciable distortion of the peripheral portion of the insert, and without damaging the adjacent material of the partition or softening it so as to relax the tensile stress in it and impair the seal. For example a current of 3,000 amperes for one second has been found suitable.

The face of the lug 36 presented to the insert may be formed with a central boss 38 surrounded by an annular trough 39, the projecting volume of the boss being equal to the recessed volume of the trough so that metal can flow from the boss and fill the trough during the welding operation. This arrangement concentrates the welding current, at least initially, in the central portion of the insert.

Figure 3:
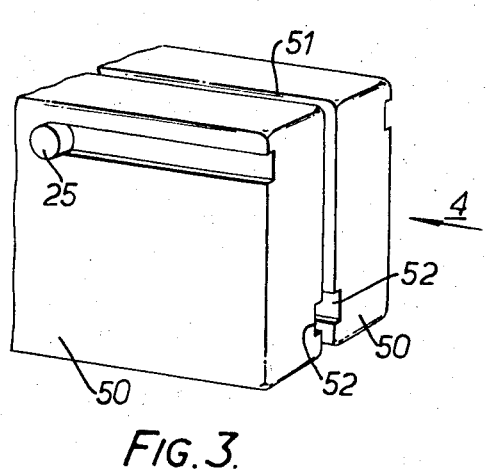
FIG. 3 is a diagrammatic perspective view of the punch slabs constituting part of the mould by which the plastic casing is formed.
Figure 4:
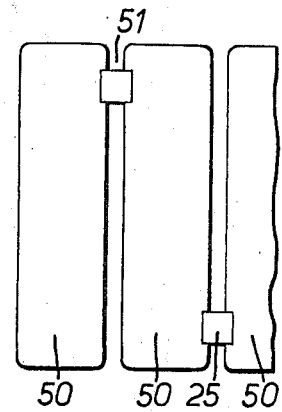
FIG. 4 is a diagrammatic elevation of the same slabs viewed in the direction of the arrow 4 of FIG. 3.

The ribs 26 of the intercell partition fulfil two purposes. First they help to reinforce the comparatively thin moulded plastics partition and secondly they facilitate the incorporation of the intercell connector inserts 25. Thus the moulding of the casing is performed by injection moulding with a mould comprising a die (not shown), and a punch formed with a number of slabs 50, one for each cell, diagrammatically indicated in FIGS. 3 and 4.

Each neighbouring pair of slabs 50 is separated by a narrow space 51 which forms the intercell partition. The opposed faces of the slab are formed with grooves 52 of a width corresponding to the diameter of the insert, each groove extending from the end of the punch corresponding to the bottom of the cell to the point at which the intercell connector is to be incorporated.

Before closing the mould an insert is slid into each pair of opposed grooves 52 so as to bridge across the gap 51 between them. The ends of the grooves 52 are semi-circular so that the insert will fit snugly into them and when the moulding occurs the grooves will form the reinforcing ribs extending from the bottom of the cell and embracing the lower half of the insert. A suitable jig may be employed to slide the inserts into the grooves and as the direction of the withdrawal of the mould is horizontal, the grooves 52 also extend horizontally and the inserts will remain in position.

The faces of the insert should make a liquid tight seal with the bottoms of the grooves in order to prevent access of plastics material to those faces, which might hamper the welding of the connector. Accordingly their thickness is carefully chosen to be equal to the spacing between the bottoms of the opposed grooves. If desired the insert may be an interference fit between the bottoms of the grooves in which case the faces are preferably of concave form as shown in FIG. 8 or FIG. 9 so as to provide a relatively small peripheral area of contact which can readily yield to ensure a snug fit without requiring excessive force for insertion into and withdrawal from the punch.

In a modified arrangement (not shown) the partition is formed without the rib 26. Alternatively the rib may be wider than the diameter of the insert 25 and may extend beyond it. In either of these cases the insert may be located in the mould by friction (being an interference fit in it). Moreover in such cases the lug may be formed with an annular rib which will exert a concentrated pressure on the face of the plastics material encircling the insert 25, or even slightly indent the material, to provide an additional seal.

What we claim as our invention and desire to secure by Letters Patent is:

1. In a method for assembling a multicell electric storage battery having partitions constructed of a moldable material for separating its cells, a plurality of plates for each cell, a plate strap for each cell for electrically interconnecting the plates of the latter and an intercell connector of electrically conductive material for each partition for electrically interconnecting the plate straps of the cells separated by the partition, wherein said method includes the step of molding said partitions between opposed, facing, generally parallel mold faces of a pair of spaced mold portions, the improvement of said method comprising:

forming respective, opposed, elongated grooves in said mold faces;

providing an intercell connector which is sufficiently long to extend into both of said grooves and inserting the connector into the grooves in a position where the connector is suspended substantially solely by contact with said grooves;

introducing said moldable material in a liquid condition into the space between said mold faces, into said grooves and around the intercell connector while the latter is disposed in said position;

allowing said moldable material to harden to thereby present a partition having said connector embedded therein and having reinforcing ribs formed thereon from the moldable material in said grooves;

welding the respective plate straps of the plates in the cells separated by said partition to the corresponding opposite ends of said connector.

2. A method as set forth in claim 1 wherein the marginal portions of the intercell connector which are surrounded with moldable material are provided with projections and recesses to interlock and key the connector into position.

3. A method as set forth in claim 2 wherein said projections and recesses provide a tongue-and-groove joint in the form of a double bevel.

4. A method as set forth in claim 2 wherein said projections and recesses provide a tongue-and-groove joint having a rectangular section.

5. A method as set forth in claim 1 wherein said introducing step comprises injection molding with a synthetic plastics material.

6. A method as set forth in claim 5 wherein said plastics material is polypropylene.

7. A method as set forth in claim 5 wherein the shrinkage of the plastics material after moulding provides an intimate seal between the connector and the surrounding portions of the partition.

8. A method as set forth in claim 1 wherein said grooves are closed at one end, presenting an abutment, said inserting including urging said connector against said abutment whereby the position of the connector relative to the partition is positively established.

9. A method as set forth in claim 1 wherein said mold portions are part of the movable punch of a punch mold structure, said grooves being deposed to extend parallel to the path of travel of the punch.

10. A method as set forth in claim 1 wherein the ends of the connector which are in said grooves are concave.

* * * * *